United States Patent
Uchisasai et al.

(10) Patent No.: US 8,922,204 B2
(45) Date of Patent: *Dec. 30, 2014

(54) FAIL DETECTING DEVICE FOR A ROTATION ANGLE SENSOR FOR AN ELECTRICAL CLUTCH

(75) Inventors: Hiroaki Uchisasai, Wako (JP); Sumitaka Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 369 days.

This patent is subject to a terminal disclaimer.

(21) Appl. No.: 13/417,536

(22) Filed: Mar. 12, 2012

(65) Prior Publication Data

US 2012/0242330 A1   Sep. 27, 2012

(30) Foreign Application Priority Data

Mar. 25, 2011 (JP) ................................. 2010-068476

(51) Int. Cl.
- *G01B 7/30* (2006.01)
- *G01B 21/22* (2006.01)
- *G01D 18/00* (2006.01)

(52) U.S. Cl.
CPC ...... *G01B 7/30* (2013.01); *G01B 21/22* (2013.01); *G01D 18/00* (2013.01)
USPC .................................................... 324/207.25

(58) Field of Classification Search
None
See application file for complete search history.

(56) References Cited

U.S. PATENT DOCUMENTS

| | | | |
|---|---|---|---|
| 7,243,625 B2* | 7/2007 | Shindou | 123/90.16 |
| 8,607,954 B2* | 12/2013 | Nedachi | 192/93 R |
| 2008/0103663 A1* | 5/2008 | Hiroi | 701/54 |
| 2011/0297504 A1* | 12/2011 | Nedachi et al. | 192/109 A |

FOREIGN PATENT DOCUMENTS

JP    2005-265768 A    9/2005

* cited by examiner

*Primary Examiner* — Vinh Nguyen
(74) *Attorney, Agent, or Firm* — Birch, Stewart, Kolasch & Birch, LLP

(57) ABSTRACT

A fail detecting device for a rotation angle sensor, for detecting a fail of the rotation angle sensor even if the number of rotation angle sensors is one. A cam is configured to be driven to rotate in one direction by an electric motor to reciprocate a push rod. An output voltage of an angle sensor is set so that the region equal to or lower than a first predetermined voltage and the region equal to or higher than a second predetermined voltage higher than the first predetermined voltage are recognized as a dead zone. The elapsed time after the transition to the dead zone is measured by a timer and it is determined that the angle sensor is in the fail state if the output voltage corresponding to the dead zone is detected although the estimated time of the passage through the dead zone has elapsed.

20 Claims, 8 Drawing Sheets

FAIL DETECTING DEVICE FOR A ROTATION ANGLE SENSOR FOR AN ELECTRICAL CLUTCH

CROSS-REFERENCE TO RELATED APPLICATIONS

The present application claims priority under 35 USC 119 to Japanese Patent Application No. 2010-068476 filed Mar. 25, 2011 the entire contents of which are hereby incorporated by reference.

BACKGROUND OF THE INVENTION

1. Field of the Invention

The present invention relates to a fail detecting device for a rotation angle sensor. More particularly to a fail detecting device for a rotation angle sensor for detecting the fail state of the rotation angle sensor that detects the rotation angle of an object to be detected.

2. Description of Background Art

Conventionally, there has been known a configuration in which a plurality of rotation angle sensors are provided in a rotation angle detecting system to detect the rotation angle of a rotating body as preparation for the occurrence of a fail such as breakdown in the rotation angle sensor.

Japanese Patent Laid-open No. 2005-265768 discloses a configuration in a rotation angle detecting system to detect the rotation angle of a ball bearing configured with a bearing ring composed of inner ring and outer ring. A plurality of spherical rolling elements rotate along the bearing ring with a cage that separates the rolling elements. More specifically, in this configuration, at least two rotation angle sensors formed of Hall elements are provided to detect the rotation angle of the cage.

However, in the technique described in Japanese Patent Laid-open No. 2005-265768, although a fail can be easily detected by comparing the respective sensor outputs even when a fail such as breakdown has occurred in any sensor, there is a problem that the increase in the number of sensors causes an increase in the number of parts and an increase in the complexity of arithmetic processing, and so forth.

SUMMARY AND OBJECTS OF THE INVENTION

An object of an embodiment of the present invention is to solve the above-described problem of the related art and provide a fail detecting device for a rotation angle sensor, capable of surely detecting a fail of the rotation angle sensor even if the number of rotation angle sensors that deal with an object to be detected is one.

To achieve the above-described object, according to an embodiment of the present invention, in a fail detecting device for a rotation angle sensor, having a cam (25) that has a cam surface in which an actuating surface (A, B) that reciprocates a push rod (35) and a non-actuating surface (C, D, E) that does not reciprocate the push rod (35) are continuously formed, an angle sensor (21) formed of an endless rotary potentiometer that detects the rotation angle of the cam (25) and has an output voltage (S) increasing in proportion to the rotation angle in a range of 360 degrees, and a controller (50) that detects a fail state of the angle sensor (21), the cam (25) is configured so as to be driven to rotate in one direction by an electric motor (1) controlled by the controller (50) to reciprocate the push rod (35). The output voltage (S) of the angle sensor (21) is set so that a region equal to or lower than a first predetermined voltage (V1) and a region equal to or higher than a second predetermined voltage (V2) higher than the first predetermined voltage (V1) are recognized as a dead zone (D). The controller (50) is configured so as to drive the rotation of the cam (25) to a predetermined position in the non-actuating surface (C, D, E) at a constant speed in transition of the cam surface of the cam (25) abutting against the push rod (35) from the side of the actuating surface (A, B) to the side of the non-actuating surface (C, D, E). The angle sensor (21) is configured so that the dead zone (D) is disposed at a position in the non-actuating surface (C, D, E) of the cam (25) and in an area in front of the predetermined position.

According to an embodiment of the present invention, the controller (50) measures an elapsed time from transition of the cam surface to the dead zone (D) by a timer (54) and determines that the rotation angle sensor (21) is in the fail state if the output voltage (S) corresponding to the dead zone (D) is detected although an estimated time of passage through the dead zone (D) has elapsed.

According to an embodiment of the present invention, the controller (50) measures an elapsed time from transition of the cam surface from the actuating surface (B) to the non-actuating surface (C) by a timer (54) and determines that the rotation angle sensor (21) is in the fail state if the output voltage (S) corresponding to the dead zone (D) is detected although an estimated time of passage through the dead zone (D) has elapsed.

According to an embodiment of the present invention, the controller (50) stores the output voltage (S) of timing to transition to the dead zone (D) as a saved value (V2) and determines that the rotation angle sensor (21) is in the fail state if the output voltage (S) is the same as the saved value (V2) although an estimated time of passage through the dead zone (D) has elapsed and a predetermined time has elapsed in this state.

According to an embodiment of the present invention, the controller (50) determines that the rotation angle sensor (21) is in the fail state if the output voltage (S) is outside a range between upper and lower limits set in advance although an estimated time of passage through the dead zone (D) has elapsed and a predetermined time has elapsed in this state.

According to an embodiment of the present invention, the controller (50) stores the sensor value (S) of timing to transition to the dead zone (D) as a saved value (V2) and determines that the rotation angle sensor (21) is in the fail state if the output voltage (S) is not a value corresponding to the predetermined position in the non-actuating surface (E) although an estimated time of passage through the dead zone (D) has elapsed.

According to an embodiment of the present invention, the cam is configured so as to be driven to rotate in one direction by the electric motor controlled by the controller and reciprocate the push rod. The output voltage of the angle sensor is set so that the region equal to or lower than the first predetermined voltage and the region equal to or higher than the second predetermined voltage higher than the first predetermined voltage are recognized as the dead zone. The controller is configured so as to drive rotation of the cam to a predetermined position in the non-actuating surface at a constant speed in the transition of the cam surface of the cam abutting against the push rod from the actuating surface side to the non-actuating surface side. The angle sensor is configured so that the dead zone is disposed at a position in the non-actuating surface of the cam and in an area in front of the predetermined position. Therefore, the predetermined time to reach to the predetermined position after the passage through the dead zone of the angle sensor in the transition of the cam from the actuating surface side to the non-actuating surface side is obtained in advance. Thus, for example if no change is observed in the sensor output although the predetermined time has elapsed from the entry into the dead zone, this can be determined to be the fail state of the angle sensor. This allows detection of the fail state of the rotation angle sensor even if the number of rotation angle sensors corresponding to the push rod is one, and thus can suppress increase in the number of parts and the cost.

According to an embodiment of the present invention, the controller measures the elapsed time from the transition of the cam surface to the dead zone by the timer and determines that the rotation angle sensor is in the fail state if the output voltage corresponding to the dead zone is detected although the estimated time of the passage through the dead zone has elapsed. Thus, the time measurement by the timer is started at the timing of the transition to the dead zone. This enhances the reliability of the time measurement for detecting the dead zone passage.

According to an embodiment of the present invention, the controller measures the elapsed time from the transition of the cam surface from the actuating surface to the non-actuating surface by the timer and determines that the rotation angle sensor is in the fail state if the output voltage corresponding to the dead zone is detected although the estimated time of the passage through the dead zone has elapsed. Thus, the time measurement by the timer is started at the timing of the transition of the cam surface from the actuating surface side to the non-actuating surface side. This enhances the reliability of the time measurement for detecting the dead zone passage.

According to an embodiment of the present invention, the controller stores the output voltage of the timing to transition to the dead zone as the saved value and determines that the rotation angle sensor is in the fail state if the output voltage is the same as the saved value although the estimated time of the passage through the dead zone has elapsed and the predetermined time has elapsed in this state. Thus, the determination as to the fail state can be accurately made by comparison between the stored saved value and the present output voltage.

According to an embodiment of the present invention, the controller determines that the rotation angle sensor is in the fail state if the output voltage is outside the range between the upper and lower limits set in advance although the estimated time of the passage through the dead zone has elapsed and the predetermined time has elapsed in this state. Thus, the determination as to the fail state can be accurately made by comparison between the upper and lower limits set in advance and the present output voltage.

According to an embodiment of the present invention, the controller stores the sensor value of the timing to transition to the dead zone as the saved value and determines that the rotation angle sensor is in the fail state if the output voltage is not a value corresponding to the predetermined position in the non-actuating surface although the estimated time of the passage through the dead zone has elapsed. Thus, the determination as to the fail state can be accurately made based on the output voltage at a position except for the dead zone.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
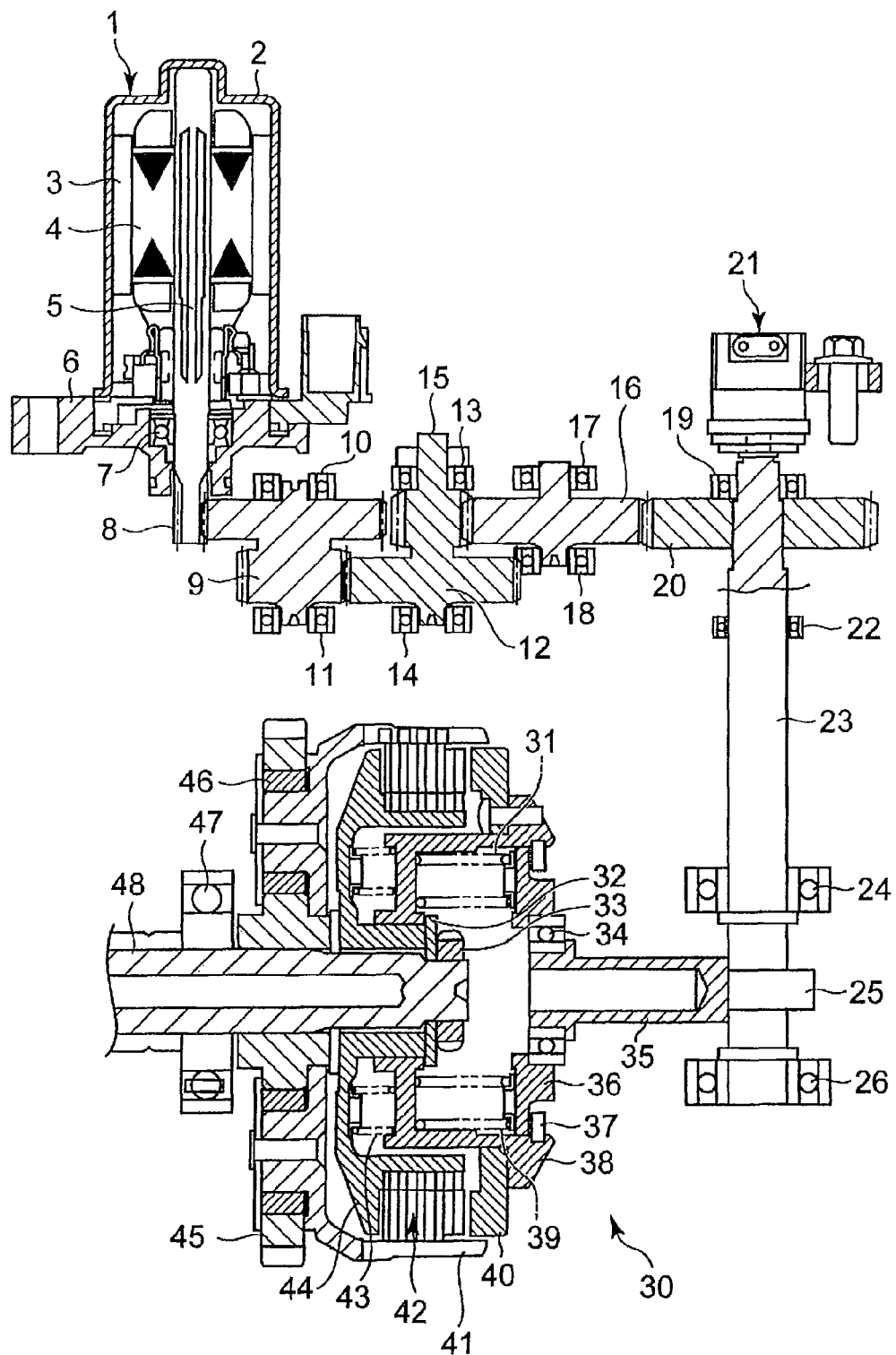
FIG. 1 is a whole configuration diagram showing the configuration of an electric clutch.

Preferred embodiments of the present invention will be described in detail below with reference to the drawings. FIG. 1 is a whole configuration diagram of an electric clutch 30 according to one embodiment of the present invention. The electric clutch 30 is e.g. a mechanism that is disposed between engine and transmission of a motorcycle or the like for controlling the disconnection and connection of the rotational driving force. The normally-open electric clutch 30 driven by an electric motor 1 is based on a double-spring system including a push spring 39 and a return spring 43 having spring rates different from each other as biasing members to bias the clutch in the open (disengagement) direction.

The electric clutch 30 is so configured that a cam shaft 23 on which a cam 25 is provided is driven to rotate to an arbitrary angle by the rotational driving force of the electric motor 1 to thereby reciprocate a push rod 35 abutting against the cam 25 and drive disengagement and engagement of the clutch.

The electric motor 1 has a rotor 4 formed integrally with an output shaft 5 and a stator 3 fixed to the inner circumference of a motor housing 2. A bearing 7 that pivotally supports the output shaft 5 is fitted into a base part 6 that seals the opening of the motor housing 2.

A gear 8 formed at an end of the output shaft 5 is meshed with a first intermediate gear 9 that is pivotally supported by bearings 10 and 11 and is composed of two gears integrally formed. The rotational driving force transmitted to the first intermediate gear 9 is transmitted to an input gear 20 spline-fitted into the cam shaft 23 via a second intermediate gear 12 pivotally supported by bearings 13 and 14 and a third intermediate gear 16 pivotally supported by bearings 17 and 18. In the second intermediate gear 12, a tool attachment shaft 15 for allowing attachment of an emergency tool (not shown) to manually rotate the second intermediate gear 12 is provided.

At the upper end of the cam shaft 23 in the diagram, a rotation angle sensor (hereinafter, it will be often referred to simply as the angle sensor) 21 formed of a potentiometer to detect the rotation angle of the cam shaft 23 is provided. The cam shaft 23 is pivotally supported by a bearing 19 disposed close to the input gear 20 and bearings 24 and 26 disposed on both sides of the cam 25 in such a manner as to be freely rotatable. In the present embodiment, an oil seal 22 is disposed at substantially the intermediate part of the cam shaft 23. This allows e.g. a layout in which the mechanism from the electric clutch 30 to the cam 25 is housed in the crankcase of the engine whereas the mechanism from the electric motor 1 to the intermediate part of the cam shaft 23 is disposed outside the crankcase.

The electric clutch 30 is attached to one end of a main shaft 48 as the input shaft of the transmission (not shown). A primary driven gear 45 that is pivotally supported on the main shaft 48 in such a manner as to be freely rotatable and to which the rotational driving force is transmitted from the crankshaft (not shown) is connected to a clutch outer 41 via plural annular dampers 46. A bearing 47 of the main shaft 48 is disposed on the left side of the primary driven gear 45 in the diagram. When the electric clutch 30 becomes the engaged state, the rotational driving force of the clutch outer 41 is transmitted to the main shaft 48 via a clutch inner 44.

More specifically, when the push rod 35 is pushed to the left side in the diagram by the rotational driving force of the electric motor 1, a first push plate 36 is pressed via a bearing 34. The push spring 39 composed of a plurality of coil springs is disposed between the first push plate 36 and a second push plate 38. The return spring 43 composed of plural coil springs is disposed between the second push plate 38 and the clutch inner 44. The second push plate 38 is slid in the left direction in the diagram against the biasing force of both springs 39 and 43. Thereby, the clutch engagement operation is carried out.

The second push plate 38 is engaged with the clutch inner 44 in such a manner so as to give a predetermined preload to the return spring 43 and is fixed to the main shaft 48 by a nut 33 with the intermediary of a washer 32 to restrict the range of the slide in the right direction in the diagram. Furthermore, the range of the slide of the first push plate 36 in the right direction in the diagram is restricted by a circlip 37. When the second push plate 38 is slid in the left direction in the diagram, a clutch plate 42 is pressed in the left direction in the diagram by an annular pressing member 40 fixed to the second push plate 38. Thereby, the electric clutch 30 is switched from the disengaged state to the engaged state.

Figure 2:
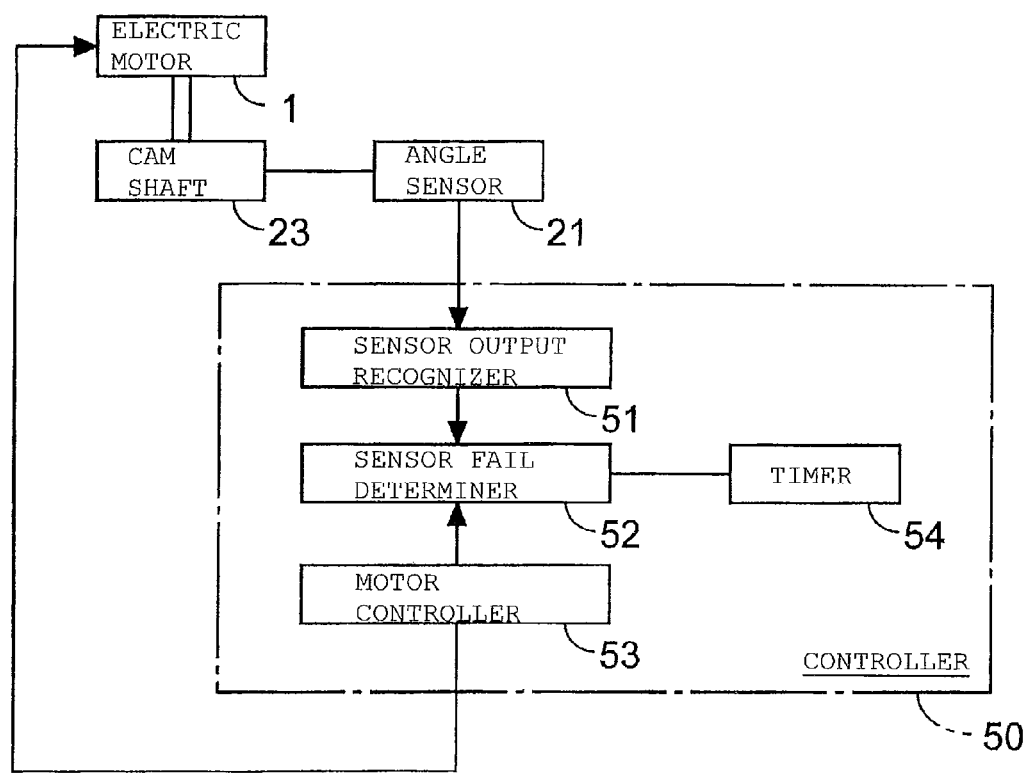
FIG. 2 is a block diagram showing the whole configuration of a fail detecting device for a rotation angle sensor according to one embodiment of the present invention.

FIG. 2 is a block diagram showing the whole configuration of the fail detecting device for a rotation angle sensor according to one embodiment of the present invention. The same numeral as that in the above description denotes the same or equivalent part. A controller 50 includes a sensor output recognizer 51 that recognizes the sensor output of the angle sensor 21, a sensor fail determiner 52 that determines the fail state of the angle sensor 21, a motor controller 53 that controls the electric motor 1, and a timer 54 that measures various predetermined times.

The sensor output recognizer 51 inputs the sensor output of the angle sensor 21 to the sensor fail determiner 52. The motor controller 53 inputs the control state of the electric motor 1 to the sensor fail determiner 52. The sensor fail determiner 52 detects the fail state of the angle sensor 21 based on the control state of the electric motor 1 and the measurement result of the timer 54 in addition to the sensor output from the angle sensor 21.

Figure 3:
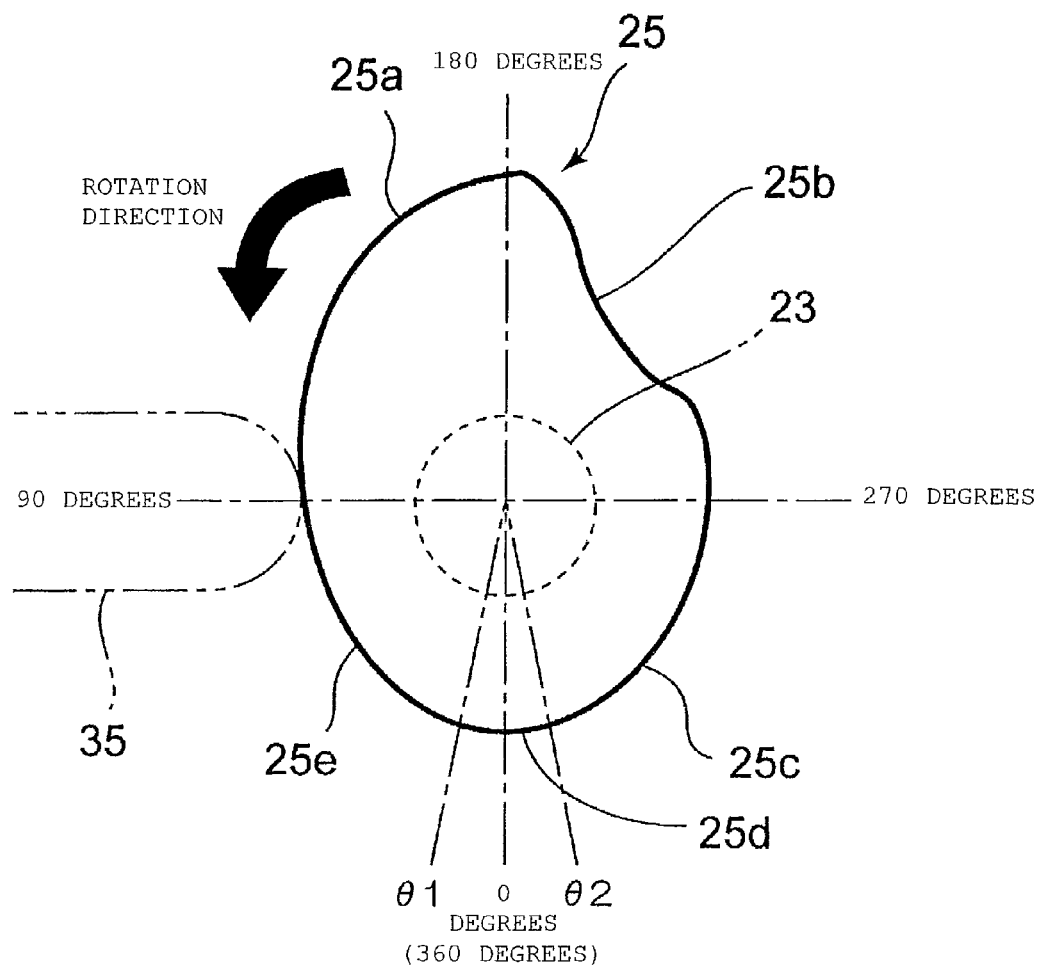
FIG. 3 is an enlarged diagram of a cam.
Figure 4:
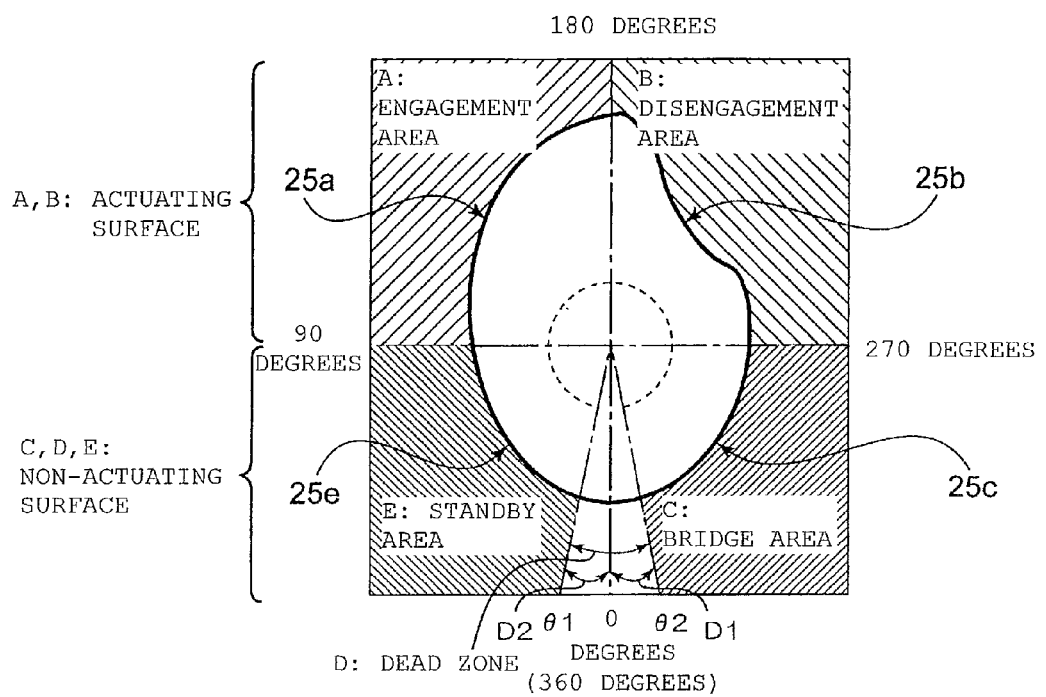
FIG. 4 is an explanatory diagram of the configuration of the cam.

FIG. 3 is an enlarged diagram of the cam 25. FIG. 4 is an explanatory diagram of the configuration of the cam 25. The cam 25 rotates integrally with the cam shaft 23 driven to rotate by the electric motor 1 to thereby reciprocate the push rod 35 that is supported so as to be capable of reciprocation in the left and right directions in the diagram.

In the cam 25, a continuous cam surface composed of cam surfaces 25*a* to 25*e* is formed. The cam 25 according to the present embodiment is driven by the electric motor 1 in such a manner so as to rotate only in the anticlockwise direction. Thereby, the cam surface abutting against the push rod 35 changes in the order of the cam surface 25*a*→25*b*→25*c*→25*d*→25*e* in association with the rotation of the cam 25.

In the present embodiment, the cam surface 25*a* that drives the clutch in the engagement direction is set as "engagement area A." The cam surface 25*b* that drives the clutch in the disengagement direction is set as "disengagement area B." The cam surface 25*c* that keeps the disengaged state of the clutch is set as "bridge area C." The cam surface 25*d* that similarly keeps the disengaged state of the clutch is set as "dead zone D." The cam surface 25*e* that similarly keeps the disengaged state of the clutch is set as "standby area E." The disengagement area B is formed so that the rising (lift amount) of the cam surface 25*b* is small, and is configured so that the clutch can be rapidly switched from the state of being engaged by the cam surface 25*a* to the disengaged state by merely driving the electric motor 1 by a slight angle. The cam surfaces 25*c*, 25*d*, and 25*e* can be formed by a single circular arc.

In the present embodiment, the engagement area A and the disengagement area B will be collectively referred to as the "actuating surface" of the clutch. Furthermore, the bridge area C, the dead zone D, and the standby area E will be collectively referred to as the "non-actuating surface" of the clutch. The area that includes the position corresponding to 0 degrees as the rotation angle of the cam 25 and ranges between an angle θ1 and an angle θ2 is defined as the dead zone D. The area from the angle θ1 to 90 degrees is defined as the standby area E. The area from 90 degrees to 180 degrees is defined as the engagement area A. The area from 180 degrees to 270 degrees is defined as the disengagement area B. The area from 270 degrees to the angle θ2 is defined as the bridge area C.

In the present embodiment, in the transition of the cam 25 from the actuating surface to the non-actuating surface, the cam 25 is driven to rotate to a predetermined position in the non-actuating surface at a constant speed to prepare for the next clutch engagement operation. More specifically, in the transition of the cam 25 from the actuating surface to the non-actuating surface, i.e. in the transition from the disengagement area B to the bridge area C, the cam 25 is driven to rotate to a predetermined position in the standby area E at a constant speed. Due to this feature, the passage through the dead zone D located between the bridge area C and the standby area E is carried out at the constant speed necessarily.

The processing of driving the rotation of the cam 25 at a constant speed is started simultaneously with the detection of the boundary between the disengagement area B and the bridge area C and can be executed for a predetermined time in which the cam 25 can be surely rotated to the standby area E. The cam 25 may be stopped at a predetermined position in the standby area E based on the output of the angle sensor 21 after the processing is started simultaneously with detection of the boundary between the disengagement area B and the bridge area C.

Figure 5:
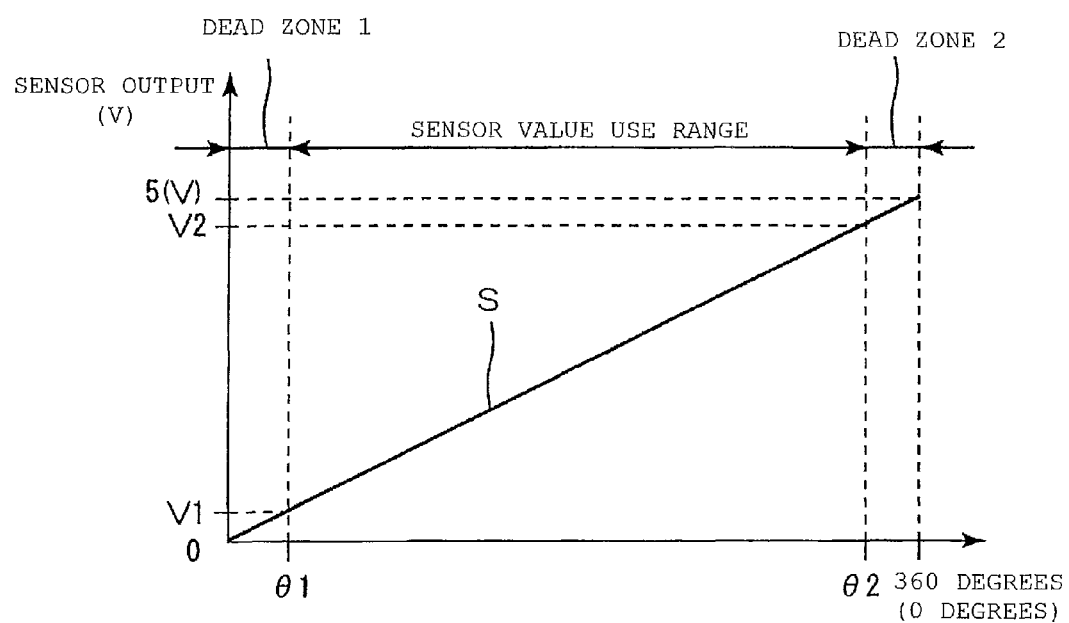
FIG. 5 is a graph showing the output characteristic of an angle sensor.
Figure 6:
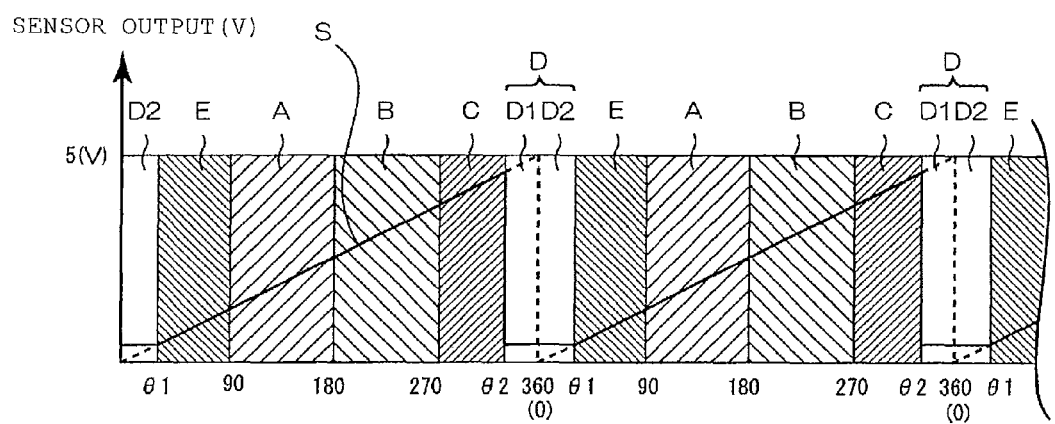
FIG. 6 is a graph showing the sensor output of the angle sensor when the cam continuously rotates.

FIG. 5 is a graph showing the output characteristic of the angle sensor 21. FIG. 6 is a graph showing the sensor output of the angle sensor when the continuously rotates. As described above, the angle sensor 21 is an endless rotary potentiometer whose sensor output (output voltage) S increases in proportion to the rotation angle in the range of 360 degrees. More specifically, the sensor output S is 0 when the angle is 0 degrees. The sensor output S increases in proportion to the angle of rotation and 5 V as the maximum voltage is generated when the angle is 360 degrees. Therefore, if the cam 25 continuously rotates in one direction, a voltage waveform having such a form as to connect 0 V and 5 V is continuously output as shown in FIG. 6.

In the present embodiment, among the sensor outputs from 0 V to 5 V, only center values that can be expected to provide high accuracy are used as the effective sensor value and the other part is set as the "dead zone." More specifically, the range from 0 degrees to the angle $\theta 1$ corresponding to a sensor output V1 (first predetermined voltage) is set as a dead zone D1 and the range from the angle $\theta 2$ corresponding to a sensor output V2 (second predetermined voltage) to 360 degrees is set as a dead zone D2. The dead zones D1 and D2 will be collectively referred to as the dead zone D.

The fail detecting device for a rotation angle sensor according to the present invention is characterized in that the dead zone D of the angle sensor 21 is disposed on the non-actuating surface side of the cam 25 and in front of the position to which the cam 25 is driven to rotate at a constant speed in the transition from the disengagement area B to the bridge area C as shown in FIG. 4. Due to this feature, in the transition of the cam 25 from the actuating surface to the non-actuating surface, the passage through the dead zone D is carried out at the constant speed necessarily. Furthermore, because the cam 25 is necessarily rotated to the predetermined position at the constant speed in the transition of the cam 25 from the actuating surface to the non-actuating surface, the position of the cam 25 can be predicted by time measurement by the timer 54.

In view of the above-described characteristic, even an angle detecting system having only one angle sensor 21 can easily detect the fail state of the angle sensor 21. For example, the transition from the bridge area C to the dead zone D can be detected due to the reaching of the sensor output S to V2. Thus, if time measurement by the timer 54 is started in response to this transition, it can be determined that a fail has occurred in the angle sensor 21 based on a phenomenon that the sensor output still remains within the sensor output range corresponding to the dead zone D even after the elapse of a predetermined time.

Furthermore, the motor controller 53 recognizes the drive signal to the electric motor 1. Thus, if the sensor output corresponding to the standby area E is not output as designed even after the end of the period in which the cam 25 is driven to the standby area E after the passage through the dead zone D at a constant speed, this can be determined to be the fail state of the angle sensor 21. Moreover, also if no change is observed in the sensor output although the electric motor 1 is being driven, this can be determined to be the fail state of the angle sensor 21. The above-described fail determination is made by the sensor fail determiner 52 shown in FIG. 2.

Figure 7:
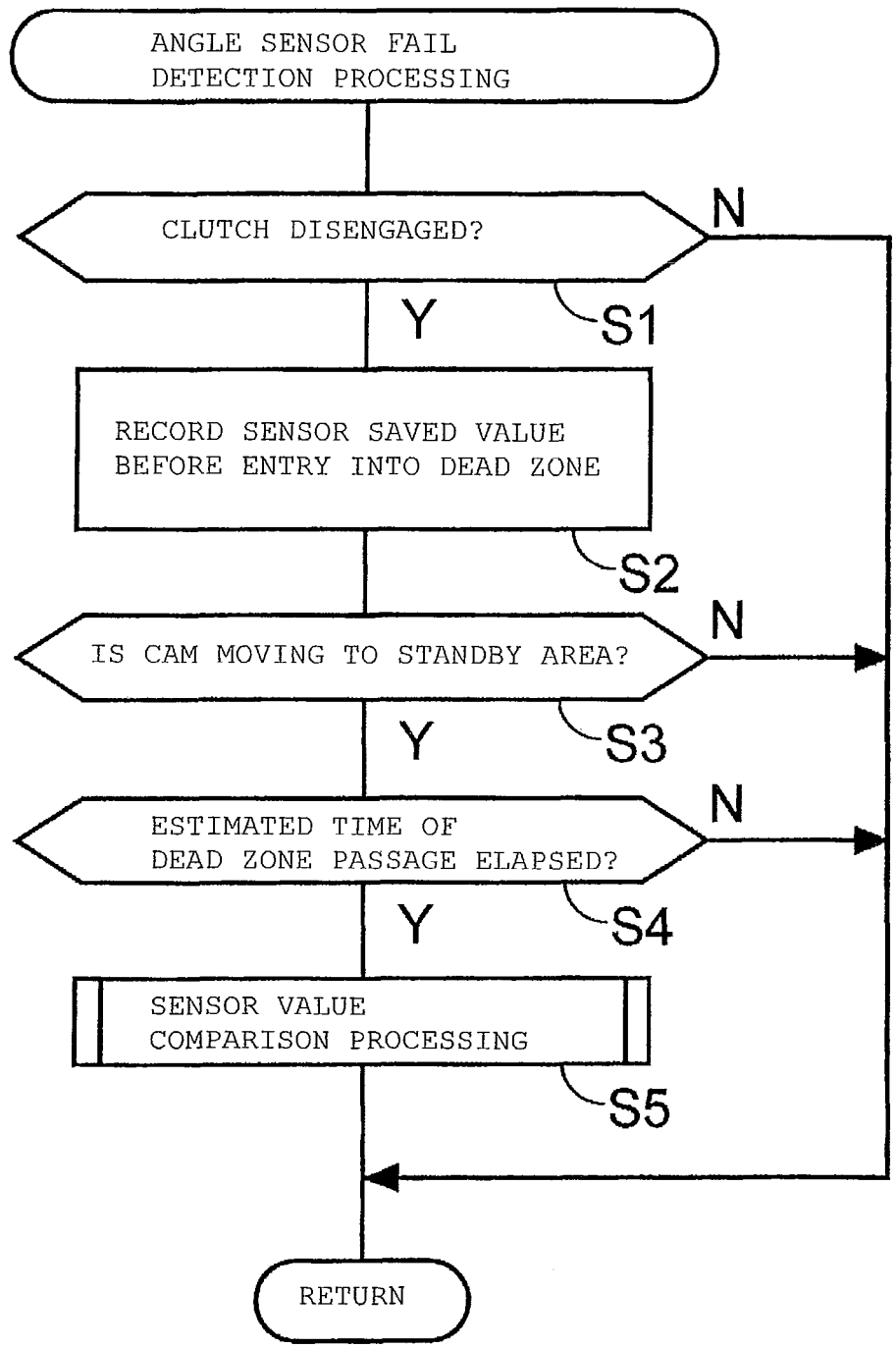
FIG. 7 is a flowchart showing the procedure of angle sensor fail detection processing according to one embodiment of the present invention.
Figure 8:
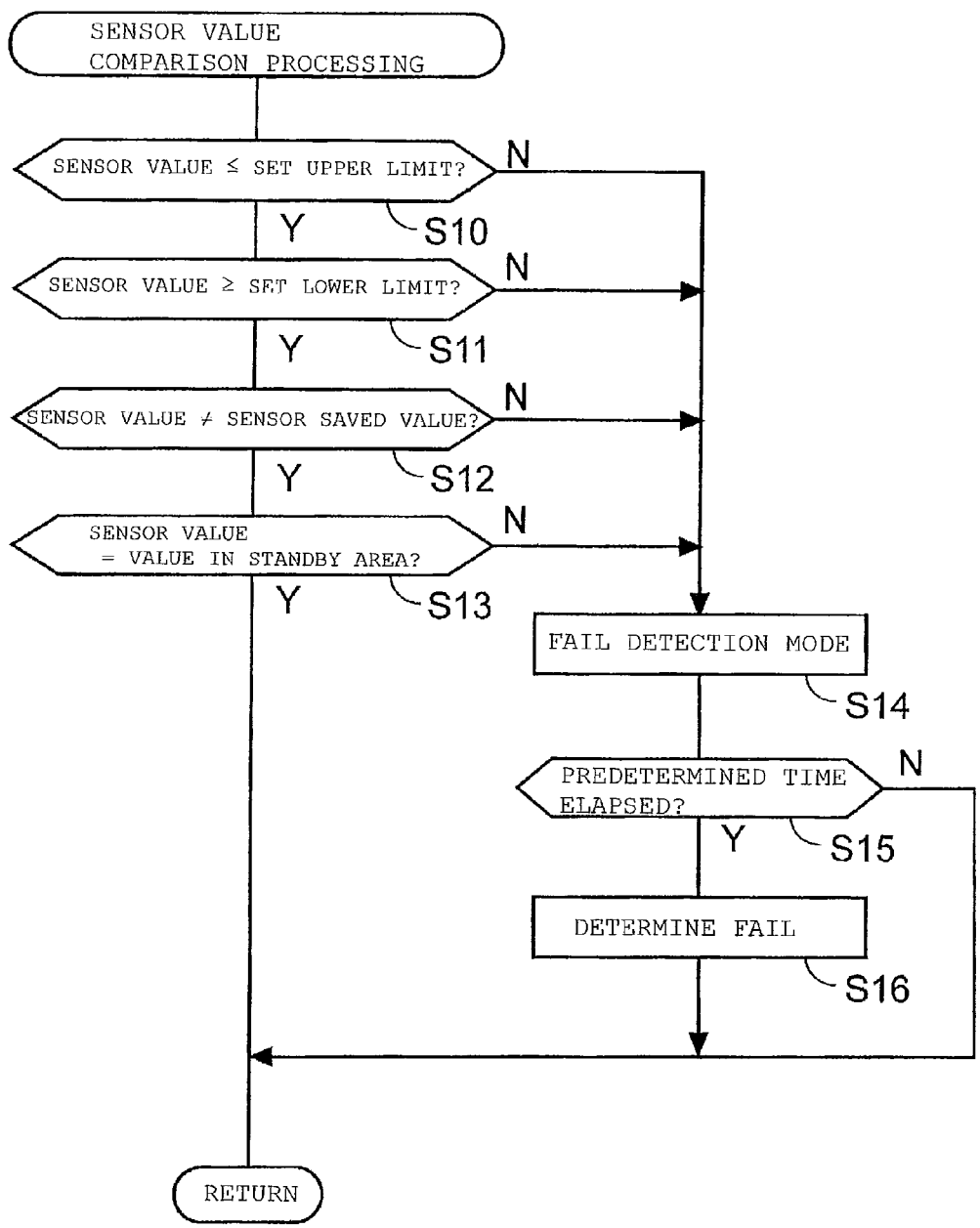
FIG. 8 is a sub-flowchart showing the procedure of sensor value comparison processing.

FIG. 7 is a flowchart showing the procedure of angle sensor fail detection processing according to one embodiment of the present invention. FIG. 8 is a sub-flowchart showing the procedure of sensor value comparison processing. In a step S1, whether or not the clutch has been disengaged is determined. This determination can be made based on whether or not the sensor output S of the angle sensor 21 has become the value corresponding to the disengagement area B of the cam 25. Furthermore, it is also possible to detect whether or not the clutch has been disengaged based on the rotation speed ratio between the crankshaft and the transmission shaft.

If the positive determination is made in the step S1, the processing proceeds to a step S2, where a sensor saved value before the entry into the dead zone D is recorded. This saved value is the sensor output S detected at the boundary of the bridge area C and the dead zone D of the cam 25. In the present embodiment, the saved value is V2 detected at the angle $\theta 2$.

In a subsequent step S3, whether or not the cam 25 is moving to the standby area E is determined. This determination is made based on whether or not control of driving the rotation of the cam 25 to a predetermined position in the standby area E at a constant speed by the motor controller 53 is being carried out. The predetermined position in the standby area E can be arbitrarily set in advance.

If the positive determination is made in the step S3, the processing proceeds to a step S4, where whether or not the estimated time of the dead zone passage has elapsed is determined. This determination can be made because the cam 25 is driven to rotate to a predetermined position in the standby area E at a constant speed in the transition from the disengagement area B to the bridge area C and time measurement by the timer 54 is started at a predetermined timing. The estimated time of the passage through the dead zone D can be calculated in advance based on the rotation speed of the cam 25. By starting the time measurement in response to detection of the boundary between the disengagement area B and the bridge area C of the cam 25 and by starting the time measurement in response to detection of the boundary between the bridge area C and the dead zone D, the completion timing of the passage through the dead zone D can be detected based on the output of the timer 54.

If the positive determination is made in the step S4, the processing proceeds to a step S5, where the sensor value comparison processing is executed. Details of this processing will be described later. If the negative determination is made in the step S1, S3, or S4, the series of control is ended directly.

FIG. 8 illustrates the sub-flow showing the procedure of the sensor value comparison processing in the above-described step S5. In a step S10, whether or not the sensor value is equal to or smaller than the set upper limit is determined. In this determination, it is determined whether or not the sensor output S sticks to the upper limit (e.g. 5 V) because any fail has occurred in the angle sensor 21. If the positive determination is made in the step S10, the processing proceeds to a step S11, where whether or not the sensor value is equal to or larger than the set lower limit is determined. In this determination, it is determined whether or not the sensor output S sticks to the lower limit (e.g. 0 V) because any fail has occurred in the angle sensor 21.

Next, if a positive determination is made in step S11, the processing proceeds to step S12, where whether or not the sensor value is in an unequal relationship with the sensor saved value is determined. This determination is made based on a prediction that the sensor output S should be a value different from the sensor saved value V2 after the passage through the dead zone D.

Subsequently, if the positive determination is made in the step S12, the processing proceeds to a step S13, where whether or not the sensor value is a value in the range corresponding to the standby area is determined. This determination is made based on a prediction that the sensor output S should be a value output in the standby area E after the passage through the dead zone D. If the positive determination is made in the step S13, it is determined that the angle sensor 21 is normally operating, so that the series of control is ended.

It is also possible to make the determination as to the fail state based on whether or not the sensor value is a value output in the dead zone. This determination is based on a prediction that the sensor output S should not be a value output in the dead zone D after the passage through the dead zone D.

If a negative determination is made in the step S10, S11, S12, or S13, the processing proceeds to a step S14, where a fail detection mode starts based on a determination that possibly any fail has occurred in the angle sensor 21. In the fail detection mode, time measurement by the timer 54 is started. In a step S15, it is determined whether or not a predetermined time has elapsed from the start of the fail detection mode, i.e. from the appearance of suspicion of a fail. If the positive determination is made in step S15, the processing proceeds to step S16, where it is determined that the angle sensor 21 is in the fail state.

As described above, in the fail detecting device for a rotation angle sensor according to the present invention, the cam 25 is driven to rotate to a predetermined position in the standby area E at a constant speed in the transition of the cam 25 from the actuating surface to the non-actuating surface, i.e. in the transition from the disengagement area B to the bridge area C. Furthermore, the angle sensor 21 is so configured that the dead zone D is disposed at a position in the non-actuating surfaces C, D, and E of the cam 25 and in the area in front of the predetermined position. Therefore, the predetermined time to reach to the predetermined position after the passage through the dead zone of the angle sensor in the transition of the cam from the actuating surface side to the non-actuating surface side is obtained in advance. Thus, for example if no change is observed in the sensor output although the predetermined time has elapsed from the entry into the dead zone, this can be determined to be the fail state of the angle sensor. This allows even a rotation angle detecting system having only one angle sensor to detect the fail state of the angle sensor and thus can suppress increase in the number of parts and the cost.

The shapes and structures of the electric motor, the cam, and the angle sensor, the size of the dead zone in the angle sensor, the sizes and arrangement of the disengagement area, the bridge area, the dead zone, the standby area, and the engagement area, etc. are not limited to the above-described embodiments and various changes are possible. The fail detecting device for a rotation angle sensor according to the present invention is not limited to the angle sensor applied to the cam that controls disengagement and engagement of the electric clutch and can be applied to various rotation angle sensors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fail detecting device for a rotation angle sensor, comprising:
    a cam with a continuously formed cam surface having an actuating surface for reciprocating a push rod and a non-actuating surface that does not reciprocate the push rod,
    an angle sensor formed of an endless rotary potentiometer for detecting a rotation angle of the cam and having an output voltage increasing in proportion to the rotational angle in a range of 360 degrees, and
    a controller for detecting a fail state of the angle sensor,
    said cam is configured to be driven to rotate in one direction by an electric motor controlled by the controller and to reciprocate the push rod;
    the output voltage of the angle sensor detects:
        a first region equal to or lower than a first predetermined voltage from 0 degrees to an angle θ1, and
        a second region equal to or higher than a second predetermined voltage higher than the first predetermined voltage from 360 degrees to an angle θ2,
        said first and second regions being recognized as a dead zone;
    the controller is configured to drive the rotation of the cam to a predetermined position in the non-actuating surface at a constant speed in transition of the cam surface of the cam abutting against the push rod from a side of the actuating surface to a side of the non-actuating surface; and
    the angle sensor is configured wherein the dead zone is disposed at a position in the non-actuating surface of the cam and in an area in front of the predetermined position.

2. The fail detecting device for a rotation angle sensor according to claim 1, wherein the controller measures an elapsed time from transition of the cam surface to the dead zone by a timer and determines that the rotation angle sensor is in a fail state if the dead zone is detected although an estimated time of passage through the dead zone has elapsed.

3. The fail detecting device for a rotation angle sensor according to claim 2, wherein the controller stores the output voltage of timing to transition to the dead zone as a saved value and determines that the rotation angle sensor is in the fail state if the output voltage is the same as the saved value although an estimated time of passage through the dead zone has elapsed and a predetermined time has elapsed in this state.

4. The fail detecting device for a rotation angle sensor according to claim 2, wherein the controller determines that the rotation angle sensor is in the fail state if the output voltage is outside a range between upper and lower limits set in advance although an estimated time of passage through the dead zone has elapsed and a predetermined time has elapsed in this state.

5. The fail detecting device for a rotation angle sensor according to claim 2, wherein the controller stores a sensor value of timing to transition to the dead zone as a saved value and determines that the rotation angle sensor is in the fail state if the output voltage is not a value corresponding to the predetermined position in the non-actuating surface although an estimated time of passage through the dead zone has elapsed.

6. The fail detecting device for a rotation angle sensor according to claim 1, wherein the controller measures an elapsed time from transition of the cam surface from the actuating surface to the non-actuating surface by a timer and determines that the rotation angle sensor is in a fail state if the dead zone is detected although an estimated time of passage through the dead zone has elapsed.

7. The fail detecting device for a rotation angle sensor according to claim 6, wherein the controller stores the output voltage of timing to transition to the dead zone as a saved value and determines that the rotation angle sensor is in the fail state if the output voltage is the same as the saved value although an estimated time of passage through the dead zone has elapsed and a predetermined time has elapsed in this state.

8. The fail detecting device for a rotation angle sensor according to claim 6, wherein the controller determines that the rotation angle sensor is in the fail state if the output voltage is outside a range between upper and lower limits set in advance although an estimated time of passage through the dead zone has elapsed and a predetermined time has elapsed in this state.

9. The fail detecting device for a rotation angle sensor according to claim 6, wherein the controller stores a sensor value of timing to transition to the dead zone as a saved value and determines that the rotation angle sensor is in the fail state if the output voltage is not a value corresponding to the predetermined position in the non-actuating surface although an estimated time of passage through the dead zone has elapsed.

10. The fail detecting device for a rotation angle sensor according to claim 1, wherein the dead zone is positioned corresponding to 0 degrees as the angle of rotation with a range of θ1 to-θ2 defining the dead zone and with the area θ1 to 90 degrees defining a standby area and with the area θ2 to 270 degrees defining a bridge area.

11. A fail detecting device for a rotation angle sensor comprising:
    a cam having a continuously formed cam surface with an actuating surface for imparting motion to reciprocates a push rod and a non-actuating surface that does not impart motion to reciprocate the push rod;
    an angle sensor formed of an endless rotary potentiometer for detecting an angle of rotation of the cam and having an output voltage increasing in proportion to the rotational angle in a range of 360 degrees;
    a controller for detecting a fail state of the angle sensor;
    said cam being configured to be driven to rotate in one direction by a motor controlled by the controller to reciprocate the push rod; and
    the output voltage of the angle sensor detects:
        a first region equal to or lower than a first predetermined voltage from 0 degrees to an angle θ1, and
        a second region equal to or higher than a second predetermined voltage higher than the first predetermined voltage from 360 degrees to an angle θ2,
        said dead zone is defined by the first and second regions;
    said controller being configured to drive the rotation of the cam to a predetermined position relative to the non-actuating surface at a constant speed in transition of the cam surface of the cam abutting against the push rod from a side of the actuating surface to a side of the non-actuating surface;
    said angle sensor being configured wherein the dead zone is disposed at a position in the non-actuating surface of the cam and in an area in front of the predetermined position.

12. The fail detecting device for a rotation angle sensor according to claim 11, wherein the controller measures an elapsed time from transition of the cam surface to the dead zone by a timer and determines that the rotation angle sensor is in a fail state if the dead zone is detected although an estimated time of passage through the dead zone has elapsed.

13. The fail detecting device for a rotation angle sensor according to claim 12, wherein the controller stores the output voltage of timing to transition to the dead zone as a saved value and determines that the rotation angle sensor is in the fail state if the output voltage is the same as the saved value although an estimated time of passage through the dead zone has elapsed and a predetermined time has elapsed in this state.

14. The fail detecting device for a rotation angle sensor according to claim 12, wherein the controller determines that the rotation angle sensor is in the fail state if the output voltage is outside a range between upper and lower limits set in advance although an estimated time of passage through the dead zone has elapsed and a predetermined time has elapsed in this state.

15. The fail detecting device for a rotation angle sensor according to claim 12, wherein the controller stores a sensor value of timing to transition to the dead zone as a saved value and determines that the rotation angle sensor is in the fail state if the output voltage is not a value corresponding to the predetermined position in the non-actuating surface although an estimated time of passage through the dead zone has elapsed.

16. The fail detecting device for a rotation angle sensor according to claim 11, wherein the controller measures an elapsed time from transition of the cam surface from the actuating surface to the non-actuating surface by a timer and determines that the rotation angle sensor is in a fail state if the dead zone is detected although an estimated time of passage through the dead zone has elapsed.

17. The fail detecting device for a rotation angle sensor according to claim 16, wherein the controller stores the output voltage of timing to transition to the dead zone as a saved value and determines that the rotation angle sensor is in the fail state if the output voltage is the same as the saved value although an estimated time of passage through the dead zone has elapsed and a predetermined time has elapsed in this state.

18. The fail detecting device for a rotation angle sensor according to claim 16, wherein the controller determines that the rotation angle sensor is in the fail state if the output voltage is outside a range between upper and lower limits set in advance although an estimated time of passage through the dead zone has elapsed and a predetermined time has elapsed in this state.

19. The fail detecting device for a rotation angle sensor according to claim 16, wherein the controller stores a sensor value of timing to transition to the dead zone as a saved value and determines that the rotation angle sensor is in the fail state if the output voltage is not a value corresponding to the predetermined position in the non-actuating surface although an estimated time of passage through the dead zone has elapsed.

20. The fail detecting device for a rotation angle sensor according to claim 11, wherein the dead zone is positioned corresponding to 0 degrees as the angle of rotation with a range of θ1 to-θ2 defining the dead zone and with the area θ1 to 90 degrees defining a standby area and with the area θ2 to 270 degrees defining a bridge area.

* * * * *